(12) United States Patent
Xu et al.

(10) Patent No.: US 12,317,250 B2
(45) Date of Patent: May 27, 2025

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Jing Xu, Guangdong (CN); Yanan Lin, Chang'an (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 870 days.

(21) Appl. No.: 17/522,586

(22) Filed: Nov. 9, 2021

(65) Prior Publication Data

US 2022/0070892 A1 Mar. 3, 2022

Related U.S. Application Data

(63) Continuation of application No. PCT/CN2019/086287, filed on May 9, 2019.

(51) Int. Cl.
*H04W 72/1263* (2023.01)
*H04L 5/00* (2006.01)
(Continued)

(52) U.S. Cl.
CPC ....... *H04W 72/1263* (2013.01); *H04L 5/0051* (2013.01); *H04L 27/2613* (2013.01); *H04W 72/0446* (2013.01)

(58) Field of Classification Search
CPC ......... H04W 72/1263; H04W 72/0446; H04W 72/1268; H04L 5/0051; H04L 27/2613; H04L 5/0044
See application file for complete search history.

(56) References Cited

U.S. PATENT DOCUMENTS

2013/0217386 A1* 8/2013 Perets .................. H04W 60/00
455/434
2013/0322270 A1 12/2013 Ko
(Continued)

FOREIGN PATENT DOCUMENTS

CN    101212813 A    7/2008
CN    104025647 A    9/2014
(Continued)

OTHER PUBLICATIONS

The first Office Action of corresponding European application No. 19928093.4, dated Jan. 20, 2023.
(Continued)

*Primary Examiner* — Fred A Casca
(74) *Attorney, Agent, or Firm* — Ladas & Parry LLP

(57) ABSTRACT

Embodiments of the present application provide a wireless communication method, a terminal device, and a network device, which may implement combining and/or discarding of a divided channel resource, mapping of a reference signal and mapping of a data transport block may be performed according to different channel resource assumptions, which can not only improve system efficiency, avoid resource waste, but also avoid collisions between a DMRS and data which affects demodulation of normal data. The method includes that: a terminal device determines a first channel to which at least one data transport block TB is mapped, where the first channel is obtained by combining at least two second channels; and the terminal device transmits the at least one data TB on the first channel.

20 Claims, 11 Drawing Sheets

(51) Int. Cl.
*H04L 27/26* (2006.01)
*H04W 72/0446* (2023.01)

(56) References Cited

U.S. PATENT DOCUMENTS

| | | | |
|---|---|---|---|
| 2015/0280888 A1 | 10/2015 | Karsi et al. | |
| 2017/0187494 A1 | 6/2017 | Tirronen et al. | |
| 2020/0044789 A1* | 2/2020 | Beale | H04L 25/0224 |
| 2020/0281012 A1* | 9/2020 | Behravan | H04W 72/1268 |
| 2022/0110069 A1* | 4/2022 | Wang | H04W 52/383 |

FOREIGN PATENT DOCUMENTS

| | | | |
|---|---|---|---|
| CN | 108023671 A | 5/2018 | |
| CN | 108418659 A | 8/2018 | |
| CN | 109150379 A | 1/2019 | |
| EP | 3925366 A1 | 12/2021 | |
| WO | 2018228176 A1 | 12/2018 | |
| WO | 2020165835 A1 | 8/2020 | |

OTHER PUBLICATIONS

The Reconsideration before Appeal of corresponding Japanese application No. 2021-566594, dated Jan. 19, 2024.
The EESR of corresponding European application No. 19928093.4, dated Apr. 7, 2022.
The Notice of Allowance of corresponding Chinese application No. 201980019824.4, dated Apr. 29, 2022.
Written Opinion of the International Searching Authority dated Jan. 13, 2020 for Application No. PCT/CN2019/086287.
CATT:"Discussion on potential enhancements to PUSCH", 3GPP Draft; R1-1900333, 3rd Generation Partnership Project (3GPP), Mobile Competence Centre; 650, Route Des Lucioles; F-06921 Sophia-Antipolis Cedex; F, vol. RAN WG1, No. Taipei; Jan. 21, 2019-Jan. 25, 2019 Jan. 20, 2019(Jan. 20, 2019), XP051593247.
Ericsson, PUSCH Enhancements for NR URLLC, R1-1906093, 3GPP TSG RAN WG1 Meeting #97, Reno, USA, May 13-17, 2019.
LG Electronics, PUSCH enhancements for NR URLLC, R1-1906666, 3GPP TSG RAN WG1 #97, Reno, USA, May 13-17, 2019.
The first Office Action of corresponding Japanese application No. 2021-566594, dated May 9, 2023.
The second Office Action of corresponding European application No. 19928093.4, dated Jul. 27, 2023.
The Rejection Notice of corresponding Japanese application No. 2021-566594, dated Aug. 22, 2023.
The Second Office Action of corresponding Japanese application No. 2021-566594, dated May 21, 2024.
International Search Report (ISR) dated Jan. 17, 2020 for Application No. PCT/CN2019/086287.
The First Office Action of corresponding Chinese application No. 201980019824.4, dated Oct. 26, 2021.
3GPP TSG RAN WG1 Meeting #97;Draft Report of 3GPP TSG RAN WG1 #96b v0.2.0, Xi'an, China, Apr. 8-12, 2019.

\* cited by examiner

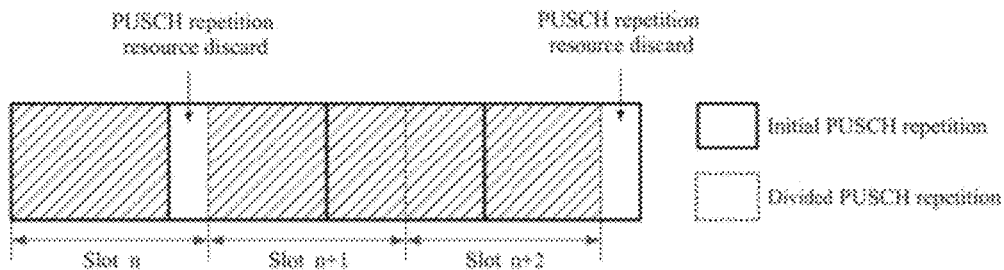
FIG. 4
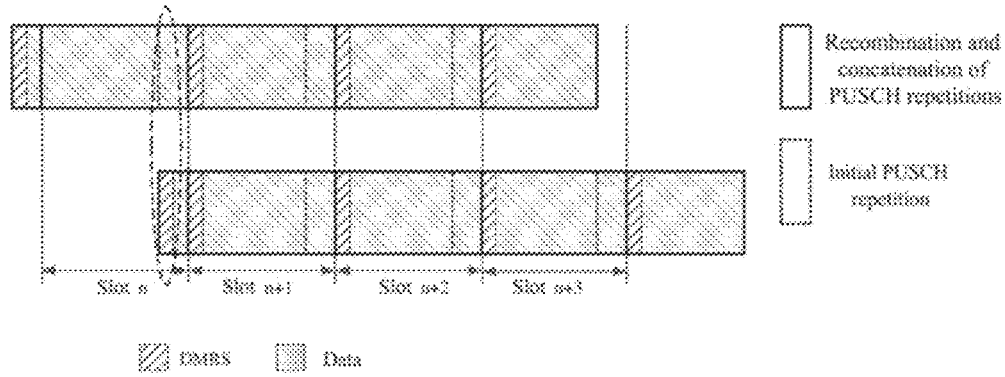
FIG. 5
```
200   A terminal device determines a first channel to which at least
      one data TB is mapped, where the first channel is obtained by      S210
      combining at least two second channels
      The terminal device transmits the at least
      one data TB on the first channel                                    S220
```
FIG. 6

WIRELESS COMMUNICATION METHOD, TERMINAL DEVICE, AND NETWORK DEVICE

CROSS-REFERENCE TO RELATED APPLICATIONS

This application is a continuation application of the International application No. PCT/CN2019/08627, filed on May 9, 2019, entitled "WIRELESS COMMUNICATION METHOD, TERMINAL DEVICE, AND NETWORK DEVICE", the content of which is hereby incorporated by reference in its entirety.

TECHNICAL FIELD

Embodiments of the present application relate to the held of communication, in particular, to a wireless communication method, a terminal device, and a network device.

BACKGROUND

In a new radio (NR) release 16 (Re16), a physical uplink shared channel (PUSCH) repetition has been enhanced, there may exist one or more PUSCHs in each slot, and time domain resources where the PUSCHs are located may be different, for example, the time domain resources for the PUSCHs may be arranged across slots. At the same time, it is possible for one PUSCH to divide into two or more PUSCHs in PUSCH repetition resources, for example, one PUSCH will be divided into two independent PUSCHs when the PUSCH crosses slots. However, PUSCH dividing leads different time domain resources for each divided PUSCH, it will impact data transmission. Therefore, how to send data on those divided PUSCHs is a technical problem to be solved urgently.

SUMMARY

Embodiments of the present application provide a wireless communication method, a terminal device, and a network device, which may implement combining and/or discarding of a divided channel resource, mapping of a reference signal and mapping of a data transport block may be performed according to different channel resource assumptions, which can not only improve system efficiency, avoid resource waste, but also avoid collisions between a DMRS and data which affects demodulation of normal data.

In a first aspect, a wireless communication method is provided, the wireless communication method includes:

determining, by a terminal device, a first channel to which at least one data transport block (TB) is mapped, where the first channel is obtained by combining at least two second channels; and transmitting, by the terminal device, the at least one data TB on the first channel.

In a second aspect, a wireless communication method is provided, the wireless communication method includes:

determining, by a network device, a first channel to which at least one data TB is mapped, where the first channel is obtained by combining at least two second channels; and transmitting, by the network device, the at least one ata TB on the first channel.

In a third aspect, a terminal device is provided and configured to execute the method of the above first aspect or respective implementations thereof.

Specifically, the terminal device includes a functional module configured to execute the method of the above first aspect or respective implementations thereof.

In a fourth aspect, a network device is provided, configured to execute the method of the above second aspect or respective implementations thereof.

Specifically, the network device includes a functional module configured to execute the method of the above second aspect or respective implementations thereof.

In a fifth aspect, a terminal device is provided, which includes a processor and a memory. The memory is configured to store a computer program, the processor is configured to call and run the computer program stored in the memory, and execute the method of the above first aspect or respective implementations thereof.

In a sixth aspect, a network device is provided, which includes a processor and a memory. The memory is configured to store a computer program, the processor is configured to call and run the computer program stored in the memory, and execute the method of the above second aspect or respective implementations thereof.

In a seventh aspect, an apparatus is provided and configured to implement the method of any one of the above first aspect to second aspect or respective implementations thereof.

Specifically, the apparatus includes: a processor, configured to call and run a computer program from a memory, so that a device installed with the apparatus executes the method of any one of the above first aspect to second aspect or respective implementations thereof.

In an eighth aspect, a computer readable storage medium is provided and configured to store a computer program that enables a computer to execute the method of any one of the above first aspect to second aspect or respective implementations thereof.

In a ninth aspect, a computer program product is provided, which includes computer program instructions that enable a computer to execute the method of any one of the above first aspect to second aspect or respective implementations thereof.

In a tenth aspect, a computer program is provided, which when running on a computer, enables a computer to execute the method of any one of the above first aspect to second aspect or respective implementations thereof.

Through the above technical solution, a terminal device may transmit at least one data TB on a first channel obtained by combining at least two second channels, thereby improving system efficiency and avoiding resource waste.

A network device may transmit at least one data TB on a first channel obtained by combining at least two second channels, thereby improving system efficiency and avoiding resource waste.

BRIEF DESCRIPTION OF DRAWINGS

FIG. 4 is a schematic diagram of a PUSCH repetition discarding provided by an embodiment of the present application.

FIG. 5 is a schematic diagram of mutual interference between data and DMRS after PUSCH repetition concatenation provided by an embodiment of the present application.

FIG. 6 is a schematic flowchart of a wireless communication method provided by an embodiment of the present application.

DESCRIPTION OF EMBODIMENTS

Technical solutions of embodiments of the present application will be described in conjunction with drawings in the embodiments of the present application. Obviously, described embodiments are part of the embodiments of the present application, not all of the embodiments. Based on the embodiments of the present application, all other embodiments obtained by persons of ordinary skills in the art without paying creative labor belong to the protection scope of the present application.

The embodiments of the present application may be applied to various communication systems, for example: a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of an NR system, an LTE-based access to unlicensed spectrum (LTE-U) system, an NR-based access to unlicensed spectrum (NR-U) system, a universal mobile telecommunication system (UMTS), a wireless local area network (WLAN), a wireless fidelity (WiFi), a next-generation communication system or other communication systems, etc.

Generally speaking, traditional communication systems support a limited number of connections and are easy to be implemented. However, with the development of communication technology, mobile communication systems will not only support traditional communications, but will also support, for example, device to device (D2D) communication, machine to machine (M2M) communication, machine type communication (MTC), and vehicle to vehicle (V2V) communication, etc. The embodiments of the present application may also be applied to these communication systems.

In an embodiment, the communication system in the embodiments of the present application may be applied to a carrier aggregation (CA) scenario, may also be applied to a dual connectivity (DC) scenario, and may also be applied to a standalone (SA) distribution network scenario.

The embodiments of the present application do not limit the applied frequency spectrum. For example, the embodiments of the present application can be applied to a licensed spectrum or unlicensed spectrum.

Figure 1:
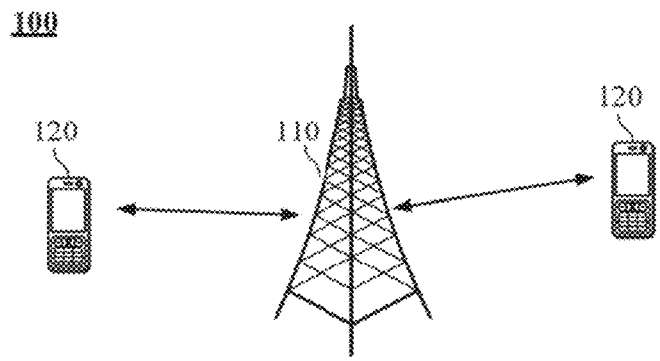
FIG. 1 is a schematic diagram of a communication system architecture provided by an embodiment of the present application.

Exemplarily, a communication system 100 applied in an embodiment of the present application is shown in FIG. 1. The communication system 100 may include a network device 110, and the network device 110 may be a device that communicates with a terminal device 120 (or called a communication terminal or a terminal). The network device 110 may provide communication coverage for a specific geographic area, and may communicate with terminal devices located in the coverage area.

FIG. 1 shows one network device and two terminal devices by way of example. Optionally, the communication system 100 may include a plurality of network devices and other number of terminal devices may be included in a coverage area of each network device, which is not limited by the embodiments of the present application.

In an embodiment, the communication system 100 may further include other network entities such as a network controller, a mobility management entity, etc., which is not limited by the embodiments of the present application.

It should be understood that a device with a communication function in a network/system in the embodiments of the present application may be called a communication device. Taking the communication system 100 shown in FIG. 1 as an example, the communication device may include the network device 110 and the terminal 120 with a communication function, and the network device 110 and the terminal 120 may be the specific devices described above, which are not described in detail here. The communication device may also include other devices in the communication system 100, for example, a network controller, a mobility management entity and other network entities, which are not limited in the embodiments of the present application.

It should be understood that the terms "system" and "network" are often used interchangeably herein. The term "and/or" is only an association relationship describing associated objects herein, which means that there may be three kinds of relationships, for example, A and/or B, which may mean that A exists alone; A and B exist at the same time; and B exists alone. In addition, characters "/" herein generally indicates that context objects are in a relationship of "or".

Various embodiments of the present application will be described in conjunction with terminal devices and network devices in the embodiments of the present application, where the terminal device may also refer to user equipment (UE), an access terminal, a user unit, a user station, a mobile station, a mobile platform, a remote station, a remote terminal, a mobile device, a user terminal, a terminal, a wireless communication device, a user agents or a user apparatus, etc. The terminal device may be a station (ST) in a WLAN, a cell phone, a cordless phone, a session initiation protocol (SIP) phone, a wireless local loop (WLL) station, a personal digital assistant (PDA) device, a handheld device, a computing device with wireless communication functions or other processing devices connected to wireless modems, an in-vehicle device, a wearable device, and a next-generation communication system, such as a terminal device in an NR network or a terminal device in a future evolved public land mobile network (PLMN).

As an example rather than a limitation, in the embodiments of the present application, the terminal device may also be a wearable device. The wearable device may also be called a wearable smart device, which is a generic term for applying wearable technology to intelligent, design of daily wear and development of wearable devices, such as glasses, gloves, watches, clothing and shoes. The wearable device is a portable device that is directly worn on a body or integrated into a user's clothes or accessories. The wearable device is not only a kind of hardware device, but also realizes powerful functions through software support, data interaction, and cloud interaction. Generalized wearable smart devices include, for example, smart watches or smart glasses, etc., which are characterized in full functions, large sizes and whose complete or partial functions can be achieved without relying on smart phones, and devices which only focus on a certain type of application function and need to be used together with other devices (such as smart phones), such as all kinds of smart bracelets and smart jewelry for physical signs monitoring.

The network device may be a device used to communicate with a mobile device. The network device may he an access point (AP) in a WLAN, a base station (BTS) in GSM or CDMA, a base station (NodeB, NB) in WCDMA, the network device may be an evolutional Node B (eNB or eNodeB) in LTE, or a relay station or an access point, or an in-vehicle device, a wearable device, and a network device or base station (gNB) in an NR network or a network device in a future evolved PLMN network.

In the embodiments of the present application, the network device provides services for a cell, and the terminal device communicates with the network device through transmission resources (for example, frequency domain resources, or frequency spectrum resources) used by the cell, the cell may be a cell corresponding to the network device (for example, a base station). The cell may belong to a macro base station or a base station corresponding to a small cell. The small cell here may include: Metro cell, Micro cell, Pico Cell, Femto cell, etc. These small cells have the characteristics of small coverage area and low transmitting power, and are suitable for providing high-rate data transmission services.

Figure 2:
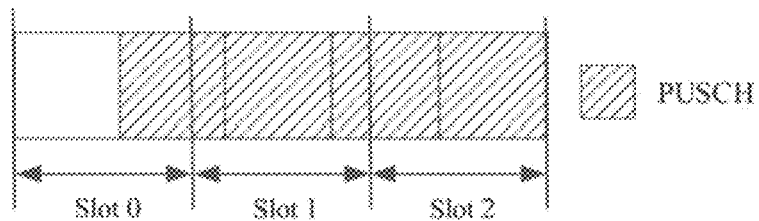
FIG. 2 is a schematic diagram of a type of PUSCH repetition dividing provided by an embodiment of the present application.
Figure 3:
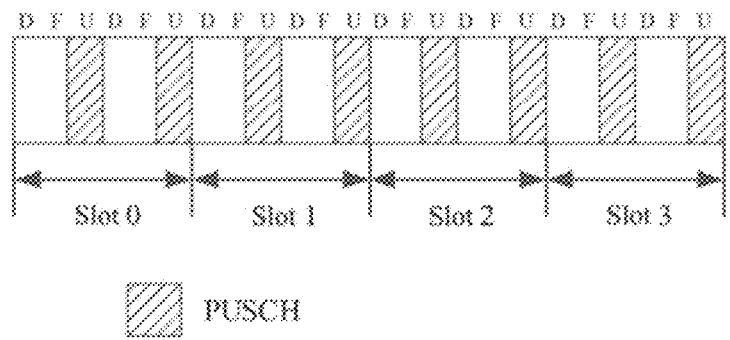
FIG. 3 is a schematic diagram of another type of PUSCH repetition dividing provided by an embodiment of the present application.

It should be understood that NR Rel 16 enhances PUSCH repetition and relaxes some restrictions, that is, there may be one or more PUSCHs in each time slot, and the time domain resources where PUSCHs are located may be different, as shown in FIG. 2 and FIG. 3. FIG. 2 contains a case that a PUSCH crosses slots, FIG. 3 contains a case that one slot includes a plurality of PUSCHs therein. Since the application scenarios are no longer restricted, data can be scheduled instantly, thereby reducing data transmission delay.

It should be noted that in FIG. 3, D represents a downlink symbol in a slot, F represents a flexible symbol in the slot, and U represents an uplink symbol in the slot.

But when the restrictions are relaxed, one PUSCH will be divided into two or more PUSCHs. As shown in FIG. 2, a PUSCH will be divided into two independent PUSCHs when the PUSCH crosses slots, that is, independent transport blocks (TB) are transmitted. As shown in FIG. 3, when a PUSCH encounters downlink and flexible resources, it will be divided automatically, and independent TBs are transmitted on the two divided PUSCHs.

After the PUSCH repetition is divided, PUSCH repetitions with a relatively short duration can be formed. These PUSCH repetitions are too short to realize effective transmission. For these PUSCH repetitions with short durations, one way is to not send the short PUSCH repetitions, which will cause resource waste, as shown in FIG. 4. Another way is to connect the short PUSCH repetition with an adjacent PUSCH repetition to form a new long PUSCH repetition, which will cause the DMRS to be misaligned and interference on performance of DMRS detection, as shown in FIG. 5.

Based on the above problems, the present application proposes a PUSCH repetition concatenation and discarding-combining method. At the same time, DMRS mapping and TB mapping are performed according to different PUSCH repetition resource assumptions, which can not only improve system efficiency, avoid resource waste, but also avoid collisions between a DMRS and data which affects demodulation of normal data.

In the following, the technical solutions designed by the present application with respect to the above technical problems are described in detail.

FIG. 6 is a schematic flowchart of a wireless communication method 200 according to an embodiment of the present application. As shown in FIG. 6, the method 200 may include some or all of the following content:

S210: a terminal device determines a first channel to which at least one data TB is mapped, where the first channel is obtained by combining at least two second channels; and S220: the terminal device transmits the at least one data TB on the first channel.

The first channel to which the at least one data TB is mapped, that is, the data TB is mapped according to a combined channel.

In an embodiment, the channel described in the embodiments of the present application includes an uplink channel and/or a downlink channel. That is, the first channel may be an uplink channel or a downlink channel. The second channel may be an uplink channel or a downlink channel.

But it should be noted that the first channel and the second channel are the same type of channel, that is, the first channel and the second channel are both downlink channels, or, the first channel and the second channel are both uplink channels.

For example, the uplink channel is a PUSCH or a physical uplink control channel (PUCCH).

For another example, the downlink channel is a physical downlink shared channel (PDSCH) or a physical downlink control channel (PDCCH).

When the first channel is an uplink channel, S220 may specifically be that the terminal device sends the at least one data TB on the first channel. When the first channel is a downlink channel, S220 may specifically be that the terminal device receives the at least one data TB on the first channel.

It should be noted that, in the embodiments of the present application, a combination of two channels may also be understood as concatenation of two channels.

In the embodiments of the present application, at least one of the at least two second channels is obtained by dividing a third channel.

For example, the at least one second channel is formed after the third channel is divided when the third channel crosses a slot boundary.

For another example, the at least one second channel is formed after the third channel is automatically divided (split).

It should be noted that, the third channel and the second channel are the same type of channel, that is, the third channel and the second channel are both downlink channels, or, the third channel and the second channel are both uplink channels.

In the embodiments of the present application, the third channel may be configured by a network device.

For example, the terminal device receives first configuration information sent by the network device, where the first configuration information is used to configure at least one third channel.

In an embodiment, the at least one third channel may be a third channel repetition.

For example, the number of repetitions of the third channel is 4, that is, 4 third channels, and the 4 third channels are continuously distributed in the time domain.

In an embodiment, the network device may configure a resource for the PUSCH repetition through an uplink grant (UL grant).

In the embodiments of the present application, whether the second channel supports combining may be configurable. Similarly, whether the second channel supports discarding may be configurable.

For example, the terminal device receives first indication information sent by the network device, where the first indication information is used to indicate whether to support combining and/or discarding of the second channel.

In the embodiments of the present application, the second channel may also support combining and discarding by default.

In an embodiment, in a case that the second channel supports combining and/or discarding, the terminal device determines whether to combine or discard the second channel according to a first rule and/or a second rule.

The first rule is at least one of the following:

whether a time domain length of the second channel is less than or equal to a first threshold value, whether an equivalent code rate of data to be transmitted on the second channel is greater than or equal to k, k is a positive number, and whether the second channel has a data transmission resource.

The second rule is whether the second channel has an adjacent second channel.

In an embodiment, the first threshold value is pre-configured, or, the first threshold value is configured by the network device.

For example, k is 1 or 0.93.

It should be noted that, the equivalent code rate may be used to determine an available data transmission resource, and may also be used to determine a modulation scheme and bits.

Specifically, if at least one of following conditions is met, the terminal device determines that the second channel meets the first rule:

the time domain length of the second channel is less than or equal to the first threshold value, the equivalent code rate of the data to be transmitted on the second channel is greater than or equal to k, and the second channel does not have a data transmission resource.

Specifically, if the second channel has an adjacent second channel, the terminal device determines that the second channel meets the second rule.

In the embodiments of the present application, the first rule and/or the second rule may be configured by the network device through radio resource control (RRC) signalling.

For example, in the first rule,the value of the first threshold value may be one symbol to four symbols.

In the embodiments of the present application, the terminal device may specifically determine whether to combine or discard the second channel in the following ways:

if the second channel does not meet the first rule, the terminal device determines not to combine or discard the second channel; and/or, if the second channel meets the first rule and does not meet the second rule. the terminal device determines to discard the second channel; and/or, if the second channel meets the first rule and meets the second rule, the terminal device determines to combine the second channel; and/or, if the second channel does not meet the first rule, the terminal device transmits a data TB on the second channel independently.

In the embodiments of the present application, in a case that the second channel supports combining and/or discarding, the terminal device combines the second channel with an adjacent second channel of the second channel.

In the embodiments of the present application, a reference signal is mapped according to the first channel.

In the embodiments of the present application, a reference signal is mapped according to the second channel.

In the embodiments of the present application, a reference signal is mapped according to a third channel, where the third channel is a configured channel.

In an embodiment, the reference signal includes a front loaded demodulation reference signal (DMRS) and/or an additional DMRS.

In the embodiments of the present application, in a case where the above channel is a PUSCH repetition, the network device sends a PUSCH repetition parameter to the terminal device; the terminal device may send uplink data according to the PUSCH repetition parameter.

Therefore, in the embodiments of the present application, the terminal device may transmit at least one data TB on the first channel obtained by the combination of the at least two second channels, thereby improving system efficiency and avoiding resource waste.

Hereafter, an example is taken where the above channel is a PUSCH, and the network device configures a PUSCH repetition resource for the terminal device, and the solution of the present application is described in detail in conjunction with specific embodiments.

Figure 7:
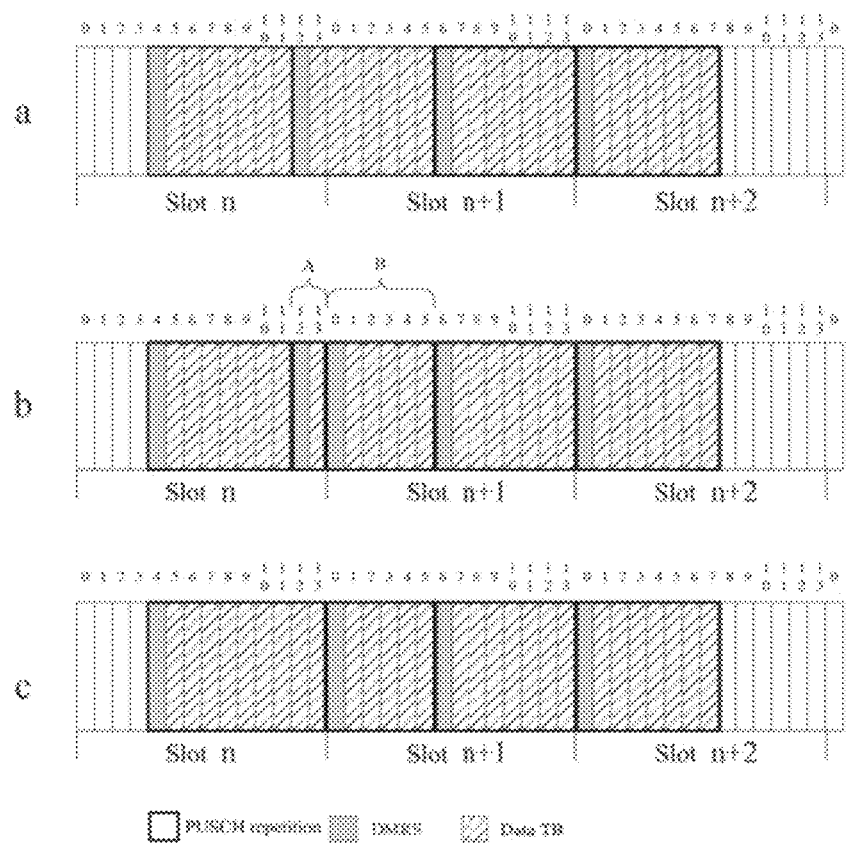
FIG. 7 is a schematic diagram of time domain resources for a PUSCH repetition provided by an embodiment of the present application.

As Embodiment 1, the number of repetitions of a PUSCH configured by the network device for the terminal device is 4 (4 third channels), a time domain position of a first PUSCH repetition is a fifth symbol—a twelfth symbol of an n-th slot, a subsequent PUSCH repetition immediately follows a previous PUSCH repetition resource in the time domain. Therefore, the time domain resources for 4 PUSCH repetitions (4 third channels) can be shown in a of FIG. 7. Furthermore, since a second PUSCH repetition crosses a slot boundary, the second PUSCH repetition is divided into a part A (2 symbols) and a part B (6 symbols) (2 second channels) in the time domain, 4 PUSCH repetitions (4 third channels) are divided into 5 PUSCH repetitions (5 second channels), as shown in b of FIG. 7. Assuming that a concatenation threshold is 3 symbols, since the part A has 2 symbols, which is less than the ConcatenationThrethold, then the part A is concatenated with a previous PUSCH repetition (to form the first channel); since the part B has 6 symbols, which is greater than the ConcatenationThrethold, then the part B will not be concatenated with a next PUSCH repetition, as shown in c of FIG. 7. A DMRS and a TB are mapped according to the concatenated PUSCH repetition, as shown in c of FIG. 7.

Therefore, in Embodiment 1, the concatenation action improves system efficiency and avoids waste caused by discard. At the same time, the concatenation with a set threshold value may not only realize short PUSCH repetitions concatenation to improve system efficiency, but also avoid long PUSCH repetitions concatenation to reduce processing delay or improve code rate. Further, a length of the PUSCH repetition is used as the ConcatenationThrethold, which not only improves system efficiency, but avoids resource waste caused by discard.

Figure 8:
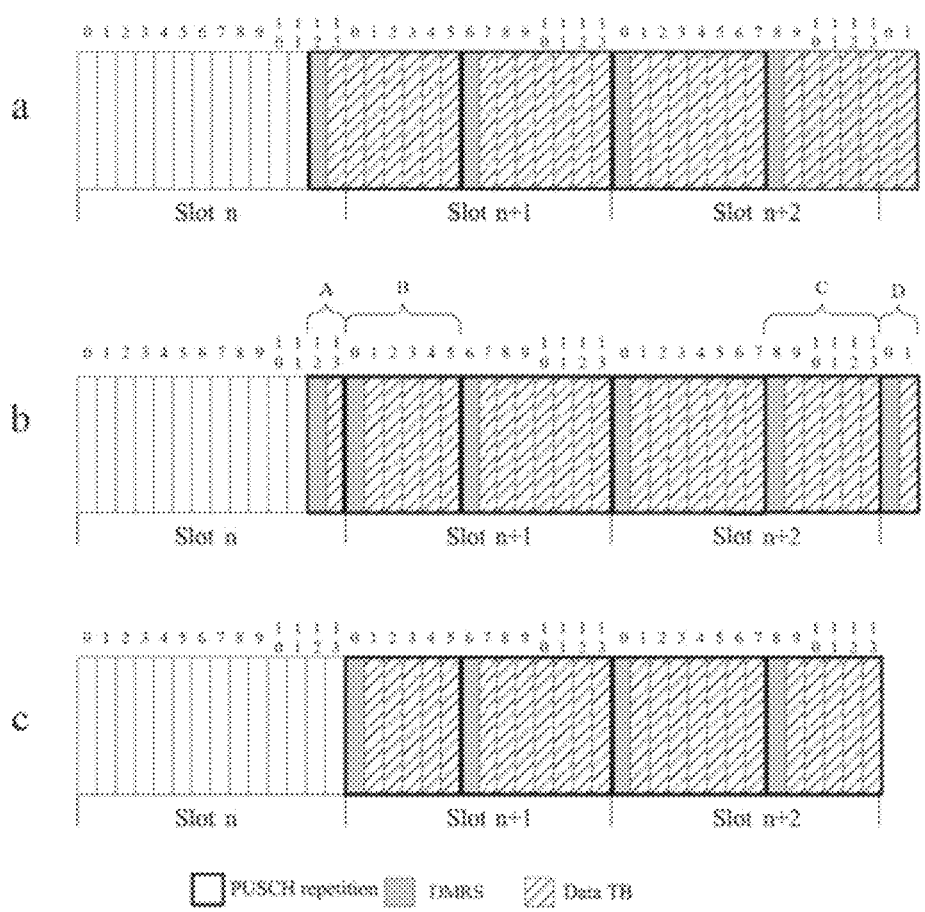
FIG. 8 is a schematic diagram of time domain resources for another PUSCH repetition provided by an embodiment of the present application.

As Embodiment 2, the number of repetitions of a PUSCH configured by the network device for the terminal device is 4 (4 third channels), a time domain position of a first PUSCH repetition is a thirteenth symbol of an nth slot—a sixth symbol of an (n+1)-th slot, a subsequent PUSCH repetition immediately follows a previous PUSCH repetition resource in the time domain. Therefore, it can be known that time domain resource for 4 PUSCH repetitions (4 third channels) can be shown in a of FIG. 8. Furthermore, since the first PUSCH repetition and a fourth PUSCH repetition cross slot boundaries, the first PUSCH repetition is divided into a part A (2 symbols) and a part B (6 symbols) (2 second channels) in the time domain, the fourth PUSCH repetition is divided into a part C (6 symbols) and a part D (2 symbols) (2 second channels) in the time domain, and 4 PUSCH repetitions (4 third channels) are divided into 6 PUSCH repetitions (6 second channels), as shown in b of FIG. 8. Assuming that the ConcatenationThrethold is 3 symbols, since the part A has 2 symbols, which is less than the ConcatenationThrethold, however, since there is no previous PUSCH repetition that can be concatenated, then the part. A is discarded; since the part B has 6 symbols, which is greater than the ConcatenationThrethold, then the part B will not be concatenated with a next PUSCH repetition; since the part C has 6 symbols, which is greater than the ConcatenationThrethold, then the part C will not be concatenated with a previous PUSCH repetition; since the part D has 2 symbols, which is less than the ConcatenationThrethold, but there is no following PUSCH repetition that can be concatenated, so the part D is discarded, as shown in c of FIG. 8. A DMRS and a TB ate mapped according to the concatenated PUSCH repetition, as shown in c of FIG. 8.

Therefore, in Embodiment 2, the discard action avoids the interference caused by misalignment of the DMRS and the data. Further, a length of the PUSCH repetition is configured as the ConcatenationThrethold, which not only improves system efficiency, but also avoids resource waste caused by discard. For PUSCH repetition without Concatenation conditions, the abandonment of the concatenation will not cause significant resource waste, and may also avoid interference between the DMRS and the data which affects the demodulation of normal data.

Figure 9:
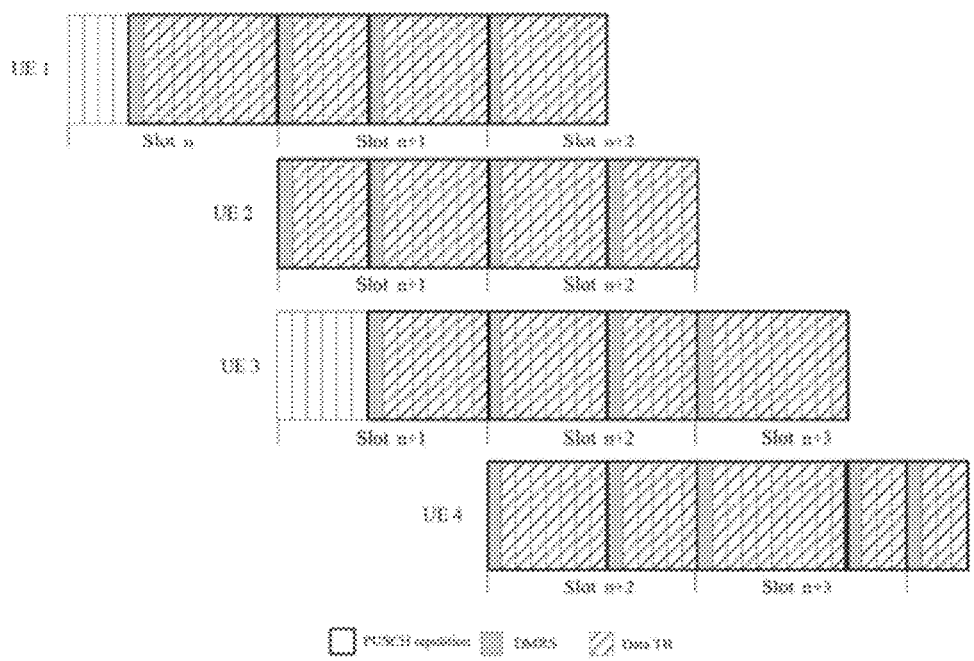
FIG. 9 is a schematic diagram of a type of pilot alignment among multiple UEs provided by an embodiment of the present application.

In an embodiment, FIG. 9 shows a comparison diagram of PUSCH repetitions of 4 UEs. The PUSCH repetitions of 4 UEs overlap in the time and frequency domains, and successively stepped back by one PUSCH repetition in the time domain. It can be seen from FIG. 9 that after concatenating/discarding of PUSCH repetitions is performed based on the rules in above Embodiment 1 and Embodiment 2, there is no collision problem between DMRS and data.

Figure 10:
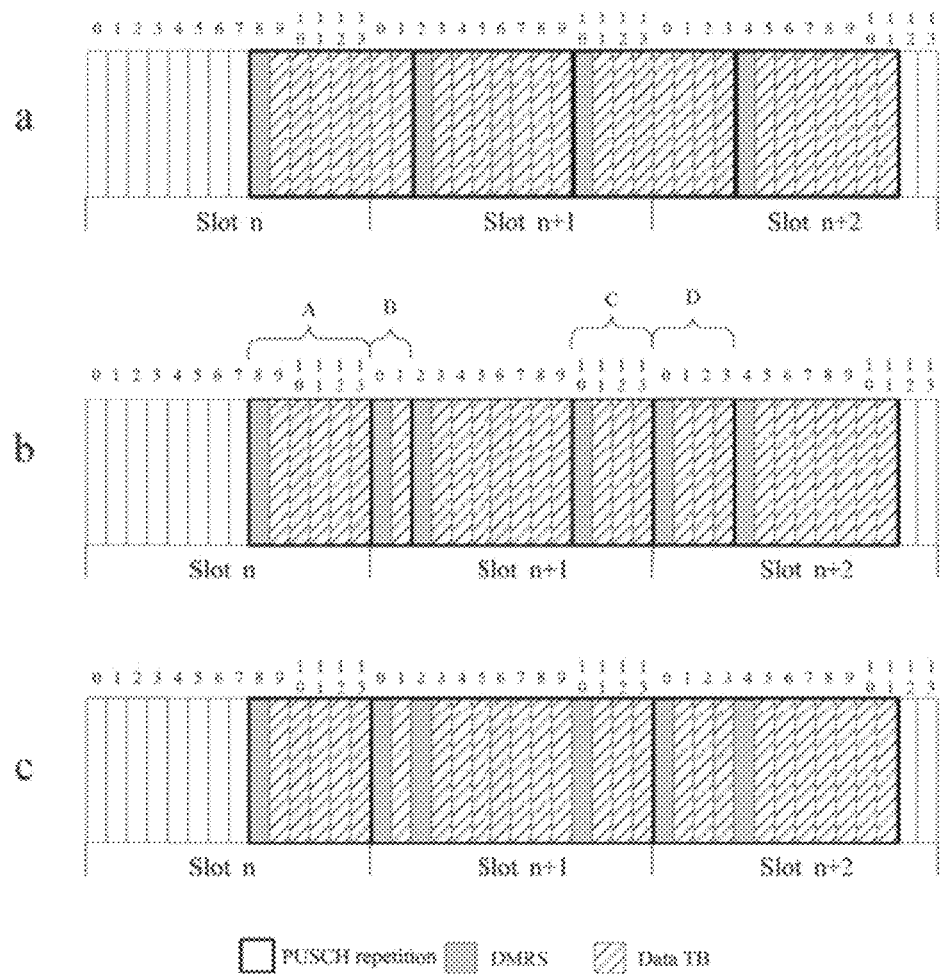
FIG. 10 is a schematic diagram of time domain resources for another PUSCH repetition provided by an embodiment of the present application.

As Embodiment 3, the number of repetitions of a PUSCH configured by the network device for the terminal device is 4 (4 third channels), a time domain position of a first PUSCH repetition is a ninth symbol of an n-th slot—a second symbol of an (n+1)-th slot, a subsequent PUSCH repetition immediately follows a previous PUSCH repetition resource in the time domain. Therefore, it can be known that time domain resources for 4 PUSCH repetitions (4 third channels) can be shown in a of FIG. 10. Furthermore, since the first PUSCH repetition and a third PUSCH repetition cross slot boundaries, the first PUSCH repetition is divided into a part A (6 symbols) and a part B (2 symbols) (2 second channels) in the time domain, the third PUSCH repetition is divided into a part C (4 symbols) and a part D (4 symbols) (2 second channels) in the time domain, and 4 PUSCH repetitions (4 third channels) are divided into 6 PUSCH repetitions (6 second channels), as shown in b of FIG. 10. A DMRS is mapped according to the divided PUSCH repetitions, as shown in b of FIG. 10. The divided PUSCH repetitions are concatenated with adjacent PUSCH repetitions. Specifically, since the part A has no adjacent PUSCH repetitions, the part A is regarded as an independent PUSCH repetition, and the part B is concatenated with a following PUSCH repetition (to form the first channel), the part C is concatenated with a previous PUSCH repetition (to form the first channel), and the part D is concatenated with a next PUSCH repetition (to form the first channel), so as to form a concatenated PUSCH repetition, at the same time a TB is mapped into a concatenated PUSCH repetition, as shown in C of FIG. 10.

Therefore, in Embodiment 3, the DMRS is inserted according to the divided PUSCH repetition to ensure the alignment of the DMRS among different PUSCH repetitions; the TB is napped according to the concatenated PUSCH repetition, which avoids the appearance of orphan symbols and improves transmission efficiency.

Figure 11:
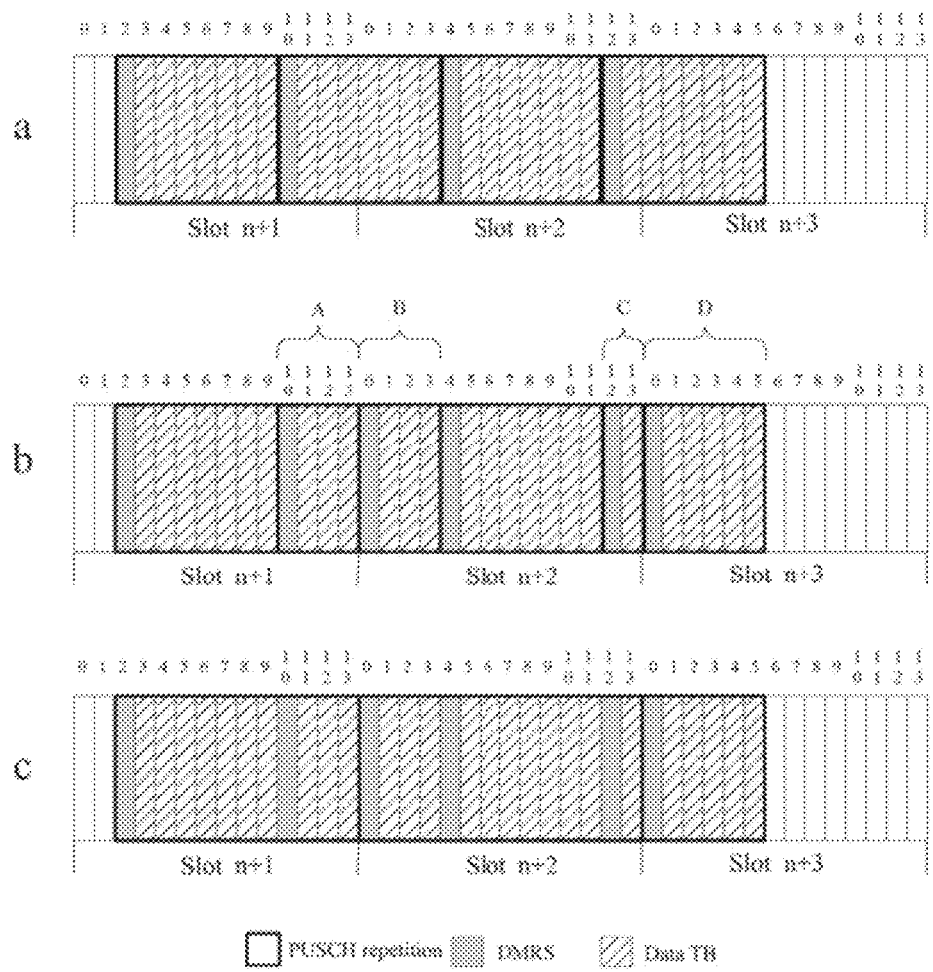
FIG. 11 is a schematic diagram of time domain resources for another PUSCH repetition provided by an embodiment of the present application.

As Embodiment 4, the number of repetitions of a PUSCH configured by the network device for the terminal device is 4 (4 third channels), a time domain position of a first PUSCH repetition is a third symbol of an (n+1)-th slot—a tenth symbol of an (n+1)-th slot, a subsequent PUSCH repetition immediately follows the previous PUSCH repetition resource in the time domain. Therefore, it can be known that the time domain resources for 4 PUSCH repetitions (4 third channels) can be shown in a of FIG. 11. Furthermore, since a second PUSCH repetition and a fourth PUSCH repetition cross slot boundaries, the second PUSCH repetition s divided into a part A (4 symbols) and a part B (4 symbols) (2 second channels) in the time domain, the fourth PUSCH repetition is divided into a part C (2 symbols) and a part D (6 symbols) (2 second channels) in the time domain, and 4 PUSCH repetitions (4 third channels) are divided into 6 PUSCH repetitions (6 second channels), as shown in b of FIG. 11. A DMRS is mapped according to the divided PUSCH repetitions, as shown in b of FIG. 11. The divided PUSCH repetitions are concatenated with adjacent PUSCH repetitions. Specifically, the part A is concatenated with the previous PUSCH repetition (to form the first channel), the part B is concatenated with the next PUSCH repetition (to form the first channel), the part C is concatenated with the previous PUSCH repetition (to form the first channel), since the part D has no adjacent PUSCH repetitions, the part D is regarded as an independent PUSCH repetition, so as to form the concatenated PUSCH repetition, at the same time a TB is mapped in a concatenated PUSCH repetition, as shown in c of FIG. 11.

Therefore, in Embodiment 4, the divided PUSCH repetitions are taken as reference for the mapping of the DMRS to ensure that the DMRS is always aligned and the performance of the DMRS demodulation is thus guaranteed; besides, since the DMRS is always at the front end of the PUSCH repetition, therefore, a detection speed is improved. Further, the TB is mapped according to the concatenated PUSCH repetition, which avoids the appearance of orphan symbols and improves transmission efficiency.

Figure 12:
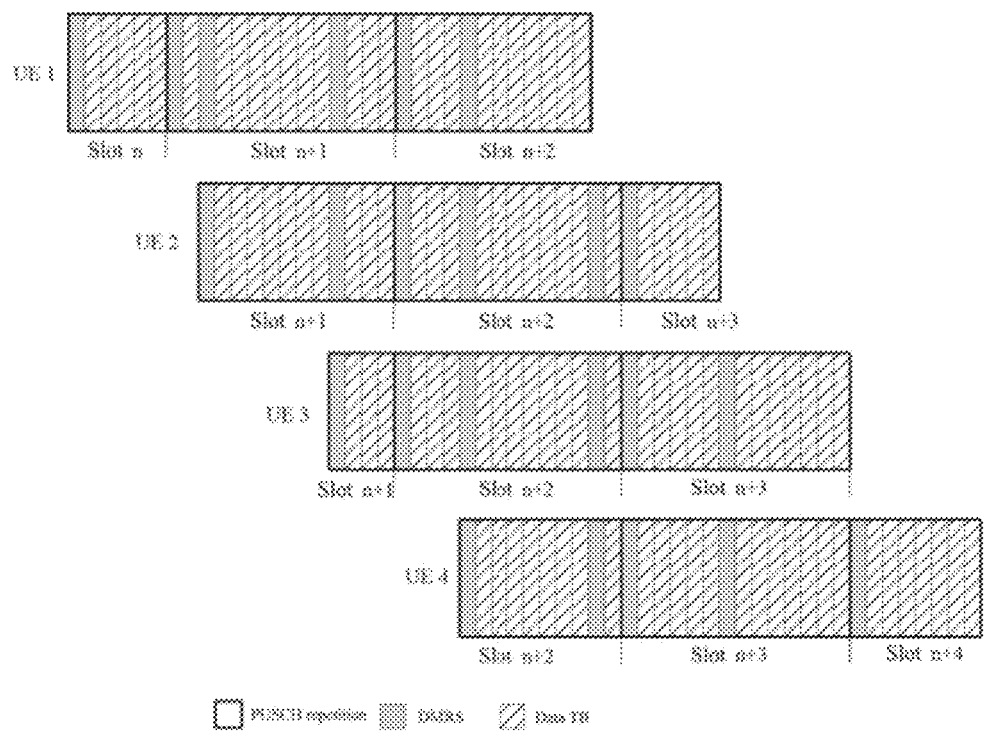
FIG. 12 is a schematic diagram of another type of pilot alignment among multiple UEs provided by an embodiment of the present application.

FIG. 12 shows a comparison diagram of PUSCH repetitions of 4 UEs. The PUSCH repetitions of 4 UEs overlap in the time and frequency domains, and successively stepped back by one PUSCH repetition in the time domain. It can be seen from FIG. 12 that after concatenating/discarding of PUSCH repetitions is performed based on the rules in above Embodiment 3 and Embodiment 4, there is no collision problem between DMRS and data.

Figure 13:
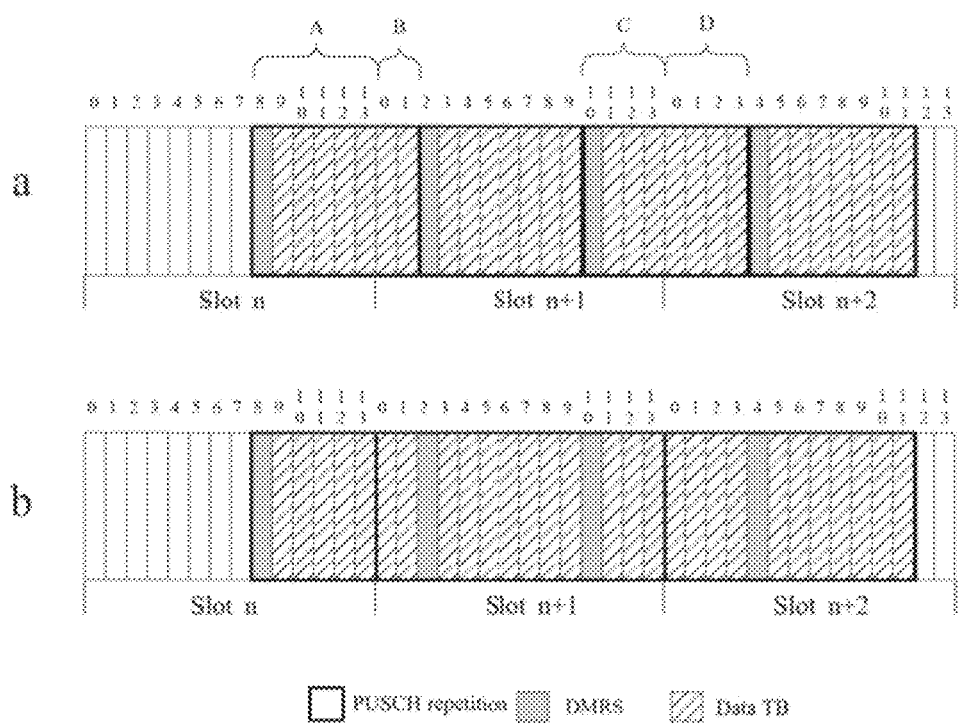
FIG. 13 is a schematic diagram of time domain resources for another PUSCH repetition provided by an embodiment of the present application.

As Embodiment 5, the number of repetitions of a PUSCH configured by the network device for the terminal device is 4 (4 third channels), a time domain position of a first PUSCH repetition is a ninth symbol of an n-th slot—a second symbol of an (n+1)-th slot, a subsequent PUSCH repetition immediately follows the previous PUSCH repetition resource in the time domain. Time domain resources for 4 PUSCH repetitions (4 third channels) are thus known, a DMRS is mapped according to the initial PUSCH repetitions (the PUSCH repetition before dividing), where a resource for the DMRS is configured by the network device, as shown in a of FIG. 13. Furthermore, since the first PUSCH repetition and a third PUSCH repetition cross slot boundaries, the first PUSCH repetition is divided into a part A (6 symbols) and a part B (2 symbols) (2 second channels) in the time domain, the third PUSCH repetition is divided into a part C (4 symbols) and a part D (4 symbols) (2 second channels) in the time domain, and 4 PUSCH repetitions (4 third channels) are divided into 6 PUSCH repetitions (6 second channels). The divided PUSCH repetitions are concatenated with adjacent PUSCH repetitions. Specifically, since the part A has no adjacent PUSCH repetition, the part A is regarded as an independent PUSCH repetition, the part B is concatenated with a following PUSCH repetition (to form the first channel), the part C is concatenated with a previous PUSCH repetition Uo form the first channel), and the part D is concatenated with a next PUSCH repetition (to form the first channel), so as to form the concatenated PUSCH repetition, at the same time a TB is mapped in a concatenated PUSCH repetition, as shown in b of FIG. 13.

Therefore, in Embodiment 5, the initial PUSCH repetitions are taken as references for the mapping of the DMRS to ensure that the DMRS is always aligned, and the performance of the DMRS demodulation is thus guaranteed. Compared with the above Embodiment 4, the cost of DMRS is less. Further, the TB is mapped accordirn to the concatenated PUSCH repetition, which avoids the appearance of orphan symbols and improves the transmission efficiency.

Figure 14:
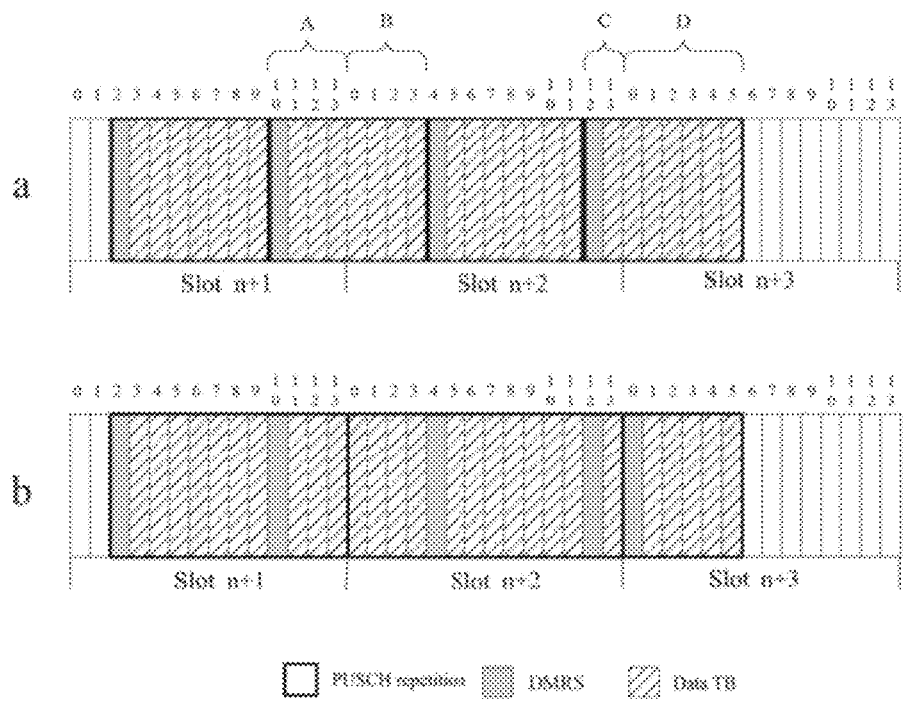
FIG. 14 is a schematic diagram of time domain resources for another PUSCH repetition provided by an embodiment of the present application.

As Embodiment 6, the number of repetitions of a PUSCH configured by network device for the terminal device is 4 (4 third channels), a time domain position of a first PUSCH repetition is a third symbol of an (n+1)-th slot—a tenth symbol of an (n+1)-th slot, a subsequent PUSCH repetition immediately follows a previous PUSCH repetition resource in the time domain. Time domain resources for 4 PUSCH repetitions (4 third channels) are thus known, a DMRS is mapped according to the initial PUSCH repetitions (the PUSCH repetition before dividing), where a resource for the DMRS is configured by the network device, as shown in a of FIG. 14. For the last divided PUSCH repetition, since there is no adjacent PUSCH repetition that can be concatenated, it is regarded as an independent PUSCH repetition. For the independent PUSCH repetition, the DMRS is also inserted, as shown in b of FIG. 14. Furthermore, since a second PUSCH repetition and a fourth PUSCH repetition cross slot boundaries, the second PUSCH repetition is divided into a part A (4 symbols) and a part B (4 symbols) (2 second channels) in the time domain, the fourth PUSCH repetition is divided into a part C (2 symbols) and a part D (6 symbols) (2 second channels) in the time domain, and 4 PUSCH repetitions (4 third channels) are divided into 6 PUSCH repetitions (6 second channels). The divided PUSCH repetitions are concatenated with adjacent PUSCH repetitions. Specifically, the part A is concatenated with a previous PUSCH repetition (to form the first channel), the part B is concatenated with a following PUSCH repetition (to form the first channel), the part C is concatenated with a previous PUSCH repetition (to form the first channel), since the part D has no adjacent PUSCH repetitions, the part D is regarded as an independent PUSCH repetition, so as to form the concatenated PUSCH repetition, at the same time a TB is mapped in a concatenated PUSCH repetition, as shown in b or FIG. 14.

Therefore, in Embodiment 6, the initial PUSCH repetition are taken as references for the mapping of the DMRS to ensure that the DMRS is always aligned, and the performance of the DMRS demodulation is thus guaranteed. Compared with Embodiment 4, the cost of DMRS is less. Further, the TB is mapped according to the concatenated PUSCH repetition, which avoids the appearance of orphan symbols and improves transmission efficiency.

Figure 15:
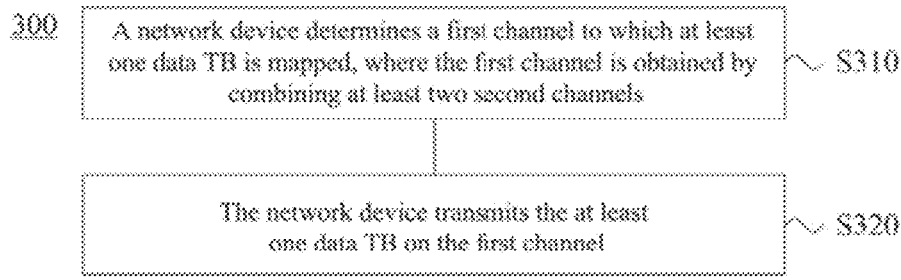
FIG. 15 is a schematic flowchart of another wireless communication method provided by an embodiment of the present application.

FIG. 15 is a schematic flowchart of a wireless communication method 300 according to an embodiment of the present application. As shown in FIG. 15, the method 300 may nclude some or all of the following content:

S310: a network device determines a first channel to which at least one data TB is mapped, where the first channel is obtained by combining at least two second channels; and S320: the network device transmits the at least one data TB on the first channel.

The first channel to which the at least one data TB is mapped, that is, the data TB is mapped according to a combined channel.

In an embodiment, the channel described in the embodiments of the present application includes an uplink channel and/or a downlink channel. That is, the first channel may be an uplink channel or a downlink channel. The second channel may be an uplink channel or a downlink channel.

But it should be noted that the first channel and the second channel are the same type of channel, that is, the first channel and the second channel are both downlink channels, or, the first channel and the second channel are both uplink channels.

For example, the uplink channel is a PUSCH or a physical uplink control channel (PUCCH).

For another example, the downlink channel is a physical downlink shared channel (PDSCH) or a physical downlink control channel (PDCCH).

When the first channel is an uplink channel, S320 may specifically be that the network device receives the at least one data TB on the first channel. When the first channel is a downlink channel S320 may specifically be that the network device sends the at least one data TB on the first channel.

It should be noted that, in the embodiments of the present application, a combination of two channels may also be understood as concatenation of two channels.

In the embodiments of the present application, at least one of the at least two second channels is obtained by dividing a third channel.

For example, the at least one second channel is formed after the third channel is divided when the third channel crosses a slot boundary.

For another example, the at least one second channel is thrilled after the third channel is automatically divided (split).

It should be noted that, the third channel and the second channel are the same type of channel, that is, the third channel and the second channel are both downlink channels, or, the third channel and the second channel are both uplink channels.

In the embodiments of the present application, the network device sends first configuration information to the terminal device, where the first configuration information is used to configure at least one third channel.

In an embodiment, the at least one third channel may be a third channel repetition.

For example, the number of repetitions of the third channel is 4, that is, 4 third channels, and the 4 third channels are continuously distributed in the time domain.

In an embodiment, the network device may configure a resource for the PUSCH repetition for the terminal device through an uplink grant (UL grant).

In an embodiment, in the embodiments of the present application, whether the second channel supports combining may be configurable. Similarly, whether the second channel supports discarding may be configurable.

For example, the network device sends first indication information, where the first indication information is used to indicate whether to support combining and/or discarding of the second channel.

In the embodiments of the present application, the second channel may also support combining and discarding by default.

In the embodiments of the present application, in a case that the second channel supports combining and/or discarding, the network device determines whether to combine or discard the second channel according to a first rule and/or a second rule, where, the first rule is at least one of the following: whether a time domain length of the second channel is less than or equal to a first threshold value, whether an equivalent code rate of data to be transmitted on the second channel is greater than or equal to k, k is a positive number, and whether the second channel has a data transmission resource.

The second rule is whether the second channel has an adjacent second channel.

For example, k is 1 or 0.93.

It should be noted that, the equivalent code rate may be used to determine an available data transmission resource, and may also be used to determine a modulation scheme and bits.

In the embodiments of the present application, the network device sends second configuration information, where the second configuration information is used to configure the first threshold value.

In the embodiments of the present application, if at least one of following conditions is net, the network device determines that the second channel meets the first rule:

the time domain length of the second channel is less than or equal to the first threshold value, the equivalent code rate of the data to be transmitted on the second channel is greater than or equal to k, and the second channel does not have a data transmission resource;

and/or, if the second channel has an adjacent second channel, the network device determines that the second channel meets the second rule.

In the embodiments of the present application, the first rule and/or the second rule may be configured by the network device for the terminal device through radio resource control (RRC) signalling.

In the embodiments of the present application, the network device may specifically determine whether to combine or discard the second channel in the following ways:

if the second channel does not meet the first rule, the network device determines not to combine or discard the second channel; and/or, if the second channel meets the first rule and does not meet the second rule, the network device determines to discard the second channel; and/or, if the second channel meets the first rule and meets the second rule, the network device determines to combine the second channel; and/or, if the second channel does not meet the first rule, the network device transmits a data TB on the second channel independently.

In the embodiments of the present application, the network device combines the second channel with an adjacent second channel of the second channel.

In the embodiments of the present application, a reference signal is mapped according to the first channel.

In the embodiments of the present application, a reference signal is mapped according to the second channel.

In the embodiments of the present application, a reference signal is mapped according to a third channel, where the third channel is a configured channel.

In an embodiment, the reference signal includes a front loaded DMRS and/or an additional DMRS.

It should be understood that reference can be made to the corresponding steps and descriptions in the wireless communication method 200 for the steps and descriptions in the wireless communication method 300. For brevity, details are not repeated herein.

Therefore, in the embodiments of the present application, the network device can transmit at least one data TB on the first channel obtained by combining at least two second channels, thereby improving system efficiency and avoiding resource waste.

Figure 16:
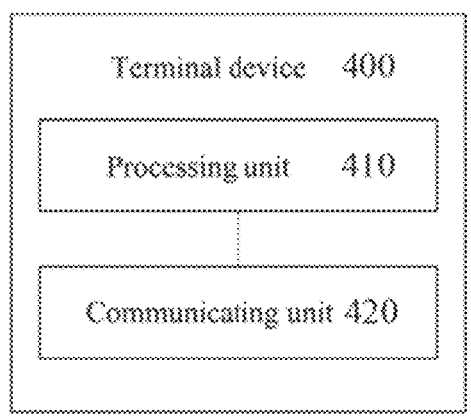
FIG. 16 is a schematic block diagram of a terminal device provided by an embodiment of the present application.

FIG. 16 shows a schematic block diagram of a terminal device 400 according to an embodiment of the present application. As shown in FIG. 16, the terminal device 400 includes:

a processing unit 410, configured to determine a first channel to which at least one data TB is mapped, where the first channel is obtained by combining at least two second channels; and a communicating unit 420, configured to transmit the at least one data TB on the first channel.

In an embodiment, at least one of the at least two second channels is obtained by dividing a third channel.

In an embodiment, the communicating unit 420 is further configured to receive first configuration information, where the first configuration information is used to configure at least one third channel.

In an embodiment, the communicating unit 420 is further configured to receive first indication information, where the first indication information is used to indicate whether to support combining and/or or discarding of the second channel.

In an embodiment, the processing unit 410 is further configured to determine whether to combine or discard the second channel according to a first rule and/or a second rule, where:

the first rule is at least one of the following: whether a time domain length of the second channel is less than or equal to a first threshold value, whether an equivalent code rate of data to be transmitted on the second channel is greater than or equal to k, k is a positive number, and whether the second channel has a data transport resource;

the second rule is whether the second channel has an adjacent second channel.

In an embodiment, the first threshold value is pre-configured or, the first threshold value is configured bye a network device.

In an embodiment, if at least one of following conditions is met, the processing unit 410 is further configured to determine that the second channel meets the first rule: the time domain length of the second channel is less than or equal to the first threshold value, the equivalent code rate of the data to be transmitted on the second channel is greater than or equal to k, and the second channel does not have a data transport resource;

and/or, if the second channel has an adjacent second channel, the processing unit 410 is further configured to determine that the second channel meets the second rule.

In an embodiment, the processing unit 410 is specifically configured to:

if the second channel does not meet the first rule, determine not to combine or discard the second channel; and/or, if the second channel meets the first rule and does not meet the second rule, determine to discard the second channel; and/or, if the second channel meets the first rule and meets the second rule, determine to combine the second channel; and/or, if the second channel does not meet the first rule, transmit a data TB on the second channel independently.

In an embodiment, the processing unit 410 is further configured to combine the second channel with an adjacent second channel of the second channel.

In an embodiment, a reference signal is mapped according to the first channel.

In an embodiment, a reference signal is mapped according to the second channel.

In an embodiment, a reference signal is mapped according to a third channel, and the third channel is a configured channel.

In an embodiment, the reference signal includes a front loaded DMRS and/or an additional DMRS.

In an embodiment, the channel includes an uplink channel and/or a downlink channel.

It should be understood that the terminal device 400 according to the embodiments of the present application may correspond to the terminal device in the method embodiments of the present application, and the above and other operation and/or function of respective units in the terminal device 400 are used to implement the corresponding process of the terminal device in method 200 shown in FIG. 6. For brevity, details are not repeated herein.

Figure 17:
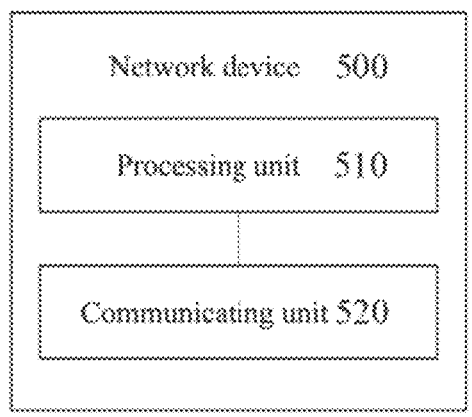
FIG. 17 is a schematic block diagram of a network device provided by an embodiment of the present application.

FIG. 17 shows a schematic block diagram of a network device 500 according to an embodiment of the present application. As shown in FIG. 17, the network device 500 includes:

a processing unit 510, configured to determine a first channel to which at least one data transport block TB is mapped, where the first channel is obtained by combining at least two second channels; and a communicating unit 520, configured to transmit the at least one data TB on the first channel.

In an embodiment, at least one of the at least two second channels is obtained by dividing a third channel.

In an embodiment, the communicating unit 520 is further configured to send first configuration information, where the first configuration information is used to configure at least one third channel.

In an embodiment, the communicating unit 520 is further configured to send first indication information, where the first indication information is used to indicate whether to support combining author discarding of the second channel.

In an embodiment, the processing unit 510 is further configured to determine whether to combine or discard the second channel according to a first rule and/or a second rule, where:

the first rule is at least one of the following: whether a time domain length of the second channel is less than or equal to a first threshold value, whether an equivalent code rate of data to be transmitted on the second channel is greater than or equal to k, k is a positive number, and whether the second channel has a data transport resource;

the second rule is whether the second channel has an adjacent second channel.

In an embodiment, the communicating unit 520 is further configured to send second configuration information, where the second configuration information is used to configure the first threshold value.

In an embodiment, if at least one of following conditions is met, the processing unit 510 is further configured to determine that the second channel meets the first rule: the time domain length of the second channel is less than or equal to the first threshold value, the equivalent code rate of the data to be transmitted on the second channel is greater than or equal to k, and the second channel does not have a data transport resource;

and/or, if the second channel has an adjacent second channel, the processing unit 510 is further configured to determine that the second channel meets the second rule.

In an embodiment, the processing unit 510 is specifically configured to:

if the second channel does not meet the first rule, determine not to combine or discard the second channel; and/or, if the second channel meets the first rule and does not meet the second rule, determine to discard the second channel; and/or, if the second channel meets the first rule and meets the second rule, determine to combine the second channel; and/or, if the second channel does not meet the first rule, transmit a data TB on the second channel independently.

In an embodiment, the processing unit 510 is timber configured to combine the second channel with an adjacent second channel of the second channel.

In an embodiment, a reference signal is mapped according to the first channel.

In an embodiment, a reference signal s mapped according to the second channel.

In an embodiment, a reference signal is mapped according to a third channel, where the third channel is a configured channel.

In an embodiment, the reference signal includes a front loaded DMRS and/or an additional DMRS.

In an embodiment, the channel includes an uplink channel and/or a downlink channel.

It should be understood that the network device 500 according to the embodiments of the present application may correspond to the network device in the method embodiments of the present application, and the above and other operation and/or function of respective units in the network device 500 are used to implement the corresponding process of the network device in method 300 shown in FIG. 15. For brevity, details are not repeated herein.

Figure 18:
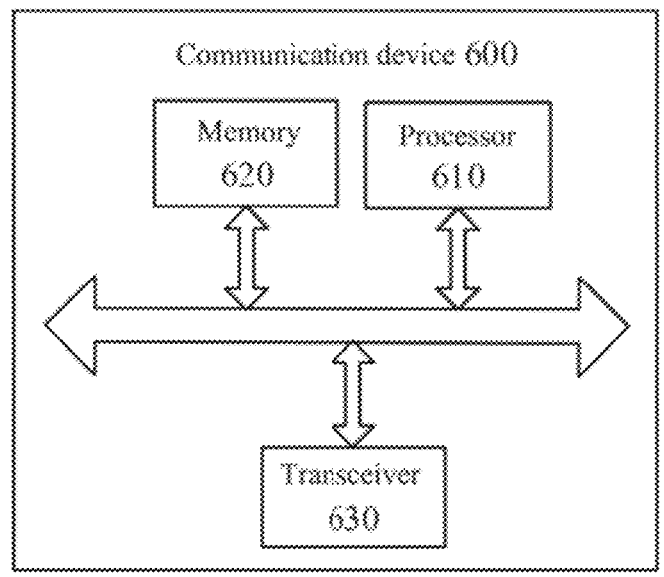
FIG. 18 is a schematic block diagram of a communication device provided by an embodiment of the present application.

FIG. 18 is a schematic structural diagram of a communication device 600 provided by an embodiment of the present application. The communication device 600 shown in FIG. 18 includes a processor 610, and the processor 610 may call and run a computer program from a memory to implement the method in the embodiments of the present application.

In an embodiment, as shown in FIG. 18, the communication device 600 may further include a memory 620. Where the processor 610 may call and run a computer program from the memory 620 to implement the method in the embodiments of the present application.

Where the memory 620 may be a separate component independent of the processor 610, or may also be integrated in the processor 610.

In an embodiment, as shown in FIG. 18, the communication device 600 may further include a transceiver 630, the processor 610 may control the transceiver 630 to communicate with other devices. Specifically, information or data may be sent to other devices, or infonrmation or data sent by the other devices may be received.

Where the transceiver 630 may include a transmitter and a receiver. The transceiver 630 may further include an antenna, the number of antennas may be one or more.

In an embodiment, the communication device 600 may specifically be a network device of the embodiments of the present application, and the communication device 600 may implement the corresponding process implemented by the network device in respective methods of the embodiments of the application. For brevity, details are not repeated herein.

In an embodiment, the communication device 600 may specifically be a. mobile terminal/terminal device of the embodiments of the present application, and the communication device 600 may implement the corresponding process implemented by the mobile terminal/terminal device in respective methods of the embodiments of the present application. For brevity, details are not repeated herein.

Figure 19:
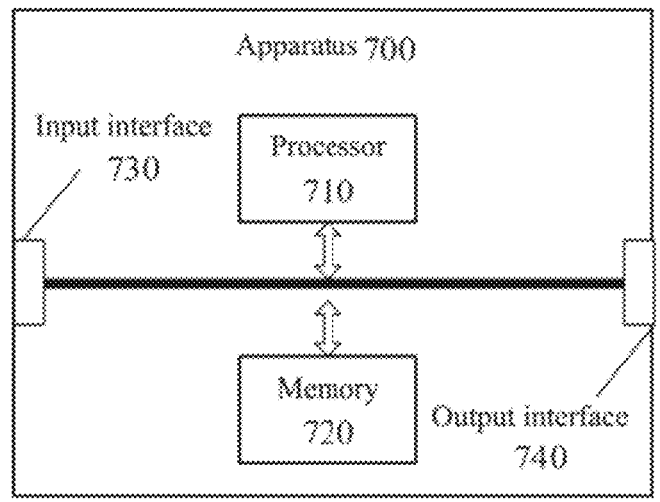
FIG. 19 is a schematic block diagram of an apparatus provided by an embodiment of the present application.

FIG. 19 is at schematic structural diagram of an apparatus of an embodiment of the present application. The apparatus 700 shown in FIG. 19 includes a processor 710, and the processor 710 may call and run a computer program from a memory to implement the method in the embodiments of the present application.

In an embodiment, as shown in FIG. 19, the apparatus 700 may further include a memory 720. Where the processor 710 may call and run a computer program from the memory 720 to implement the method in the embodiments of the present application.

Where the memory 720 may be a separate component independent of the processor 710, or may also be integrated in the processor 710.

In an embodiment, the apparatus 700 may further include an input interface 730. Where the processor 710 may control the input interface 730 to communicate with other devices or chips, specifically, may acquire information or data sent by other devices or chips.

In an embodiment, the apparatus 700 may further include an output interface 740. Where the processor 710 may control the output interface 740 to communicate with other devices or chips, specifically, may output information or data to other devices or chips.

In an embodiment, the apparatus can be applied to a network device in the embodiments of the present application, and the apparatus may implement the corresponding processes implemented by the network device in each method of the embodiments of the present application. For brevity, details are not repeated herein.

In an embodiment, the apparatus can be applied to a mobile terminal/terminal device in the embodiments of the present application, and the apparatus may implement the corresponding processes implemented by the mobile terminal/terminal device in each method of the embodiments of the present application. For brevity, details are not repeated herein.

In an embodiment, the apparatus mentioned in the embodiments of the present application may also be a chip. For example, it may be a system-level chip, a system chip, a chip system, or a system-on-chip, etc.

Figure 20:
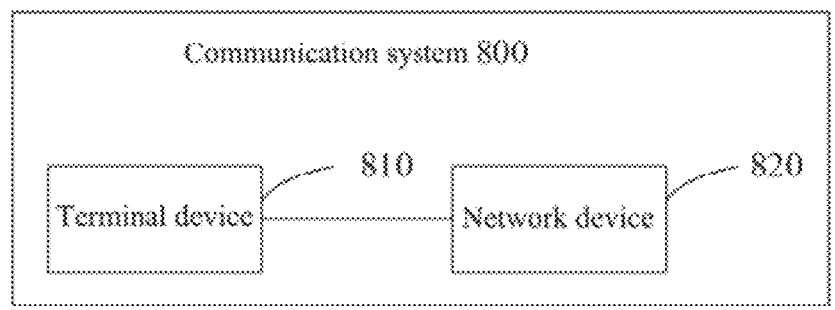
FIG. 20 is a schematic block diagram of a communication system provided by an embodiment of the present application.

FIG. 20 is a schematic block diagram of a communication system 800 provided by an embodiment of the present application. As shown in FIG. 20, the communication system 800 includes a terminal device 810 and a network device 820.

Where the terminal device 810 may be configured to implement the corresponding functions implemented by the terminal device in the above method, and the network device 820 may be configured to implement the corresponding functions implemented by the network device in the above method. For brevity, it will not be repeated herein.

It should be understood that the processor of the embodiments of the present application may be an integrated circuit chip with signal processing capabilities. In the implementation process, the steps of the above method embodiments may be completed by integrated logic circuits of hardware in the processor or by instructions in the form of software. The above processor may be a general processor, a digital signal processor (DSP), an application specific integrated circuit (ASIC), a field programmable gate array (FPGA) or other programming logic devices, discrete gates or transistor logic devices, discrete hardware components. The methods, steps, and logical block diagrams disclosed in the embodiments of the present application may be implemented or executed. The general processor may be a microprocessor or the processor may also be any conventional processor or the like. The steps in conjunction with the method disclosed in the embodiments of the present application may be directly embodied as being executed and implemented by a hardware decoding processor, or executed and implemented by a combination of hardware and a software module in the decoding processor. The software module can be located in a mature storage medium in the art, such as a random access memory, a flash memory, a read-only memory, a programmable read-only memory or an electrically erasable programmable memory, a register or the like. The storage medium is located in the memory, and the processor reads information in the memory and implements the steps of the above method in conjunction with hardware thereof.

It can be understood that the memory in the embodiments of the present application may be a volatile memory or a non-volatile memory, or may include both volatile and non-volatile memories. Where the non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which is used as an external cache. By way of exemplary but not restrictive description, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM)) and a direct ramous random access memory (DR RAM). It should be noted that the memories of the systems and methods described herein are intended to include, but are not limited to, these and any other suitable types of memories.

It should be understood that the above memory is exemplary but not restrictive. For example, the memory in the embodiments of the present application may also be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM) and a direct rambus random access memory (DR RAM), etc. That is, the memory in the embodiments of the present application is intended to include, but is not limited to, these and any other suitable types of memory.

The embodiments of the present application also provide a computer readable storage medium configured to store a computer program.

In an embodiment, the computer-readable storage medium can be applied to a network device in the embodiments of the present application, and the computer program enables a computer to execute the corresponding process implemented by the network device in each method of the embodiments of the present application. For brevity, details are not repeated herein.

In an embodiment, the computer-readable storage medium can be applied to a mobile terminal/terminal device in the embodiments of the present application, and the computer program enables a computer to execute the corresponding process implemented by the mobile terminal/terminal device in each method of the embodiments of the present application. For brevity, details are not repeated herein.

The embodiments of the present application also provide a computer program product including computer program instructions.

In an embodiment, the computer program product can be applied to a network device in the embodiments of the present application, and the computer program instructions enable a computer to execute the corresponding process implemented by the network device in each method of the embodiments of the present application. For brevity, details are not repeated herein.

In an embodiment, the computer program product can be applied to a mobile terminal/terminal device in the embodiments of the present application, and the computer program instructions enable a computer to execute the corresponding process implemented by the mobile terminal/terminal device in each method of the embodiments of the present application, for brevity, details are not repeated herein.

The embodiments of the present application also provide a computer program.

In an embodiment, the computer program can be applied to a network device in the embodiments of the present application, the computer program, when running on a computer, enables the computer to execute the corresponding process implemented by the network device in each method of the embodiments of the present application. For brevity, details are not repeated herein.

In an embodiment, the computer program can be applied to a mobile terminal/terminal device in the embodiments of the present application, the computer program, when running on a computer, enables the computer to execute the corresponding process implemented by the mobile terminal/terminal device in each method of the embodiments of the present application. For brevity, details are not repeated herein.

Persons of skills in the art may be aware that the units and algorithm steps of the examples described in combination with the embodiments disclosed herein may be implemented by electronic hardware or a combination of computer software and electronic hardware. Whether these functions are executed by hardware or software depends on a specific application and a design constraint condition of the technical solutions. Professionals may use different methods for each specific application to implement the described functions, such implementation, however, should not be considered as being beyond scope of the present application.

Persons of skills in the art may clearly understand that, for convenience and conciseness of descriptions, reference may be made to a corresponding process in the precious method embodiments for a specific working process of the above-described system, device, and unit, which will not be described here.

In the several embodiments provided in the present application, it should be understood that the disclosed system, apparatus, and method may be implemented in other ways. For example, the apparatus embodiments described above are only illustrative, For example, the division of the units is only a division of logical functions, and there may be other divisions in actual implementation, for example, a plurality of units or components may be combined or integrated into another system, or some features may be omitted or not implemented. In addition, the displayed or discussed mutual coupling, direct coupling or communication connection may be indirect coupling or communication connection through some interfaces, apparatus, or units, and may be in electrical, mechanical or other forms.

The units described as separate components may or ma not be physically separated, and the components displayed as units may or may not be physical units, that is, the components may be located in a place, or the components may be distributed to a plurality of network units. Some or all of the units may be selected according to actual demand to achieve objectives of the solutions of the present embodiments.

In addition, functional units in each embodiment of the present application may be integrated into one processing unit, or each unit may exist alone physically, or two or more units may be integrated into one unit.

If the functions are implemented in a form of a software functional unit and sold or used as an independent product, it may be stored in a computer readable storage medium. Based on such understanding, the technical solutions of the present application essentially or a part that contributes to the existing technology or a part of the technical solutions may be embodied in a form of a software product. The computer software product is stored in a storage medium and includes several instructions which are used to enable a computer device (which may be a personal computer, a server, or a network device, etc.) to perform all or a part of the steps of the methods described in the various embodiments of the present application. The above-mentioned storage medium includes: a U disk, a mobile hard disk, a read-only memory (ROM), a random access memory (RAM), a magnetic disk, an optical disk or other medium that may store program codes.

The above are only specific implementations of the present application, but the protection scope of the present application is not limited thereto. Within the technical scope disclosed in the present application, changes or substitutions that may be easily thought of by any person of skills who is familiar with the present technical field should be covered in the protection scope of the present application. Therefore, the protection scope of the present application should he subject to the protection scope of claims.

What is claimed is:

1. A wireless communication method, comprising:
   determining, by a terminal device, a first physical uplink shared channel (PUSCH) repetition to which at least one data transport block (TB) is mapped, wherein the first PUSCH repetition consists of at least two second PUSCH repetitions and at least one of the at least two second PUSCH repetitions is obtained by dividing a third PUSCH repetition crossing a slot boundary; and
   transmitting, by the terminal device, the at least one data TB on the first PUSCH repetition;
   wherein the method further comprises:
   based on determining that each of the at least two second PUSCH repetitions does not meet a first rule that a time domain length of a second PUSCH repetition is less than or equal to a first threshold value, transmitting, by the terminal device, a data TB of the at least one data TB on each of the at least two second PUSCH repetitions independently.

2. The method according to claim 1, wherein the method further comprises:
   receiving, by the terminal device, first configuration information, wherein the first configuration information is used to configure at least one third PUSCH repetition.

3. The method according to claim 1, wherein the method further comprises:
   based on determining that each of the at least two second PUSCH repetitions meets the first rule and meets a second rule, determining, by the terminal device, to combine each of the at least two second PUSCH repetitions;
   wherein the second rule is whetherthe second PUSCH repetition has an adjacent second PUSCH repetition.

4. The method according to claim 1, wherein the method further comprises:
   based on determining that each of the at least two second PUSCH repetitions meets the first rule and does not meet a second rule, determining, by the terminal device, to discard each of the at least two second PUSCH repetitions,
   wherein the second rule is that a second PUSCH repetition has an adjacent second PUSCH repetition.

5. The method according to claim 1, wherein a reference signal is mapped according to the at least two second PUSCH repetitions.

6. A wireless communication method, comprising:
   determining, by a network device, a first physical uplink shared channel (PUSCH) repetition to which at least one data transport block (TB) is mapped, wherein the first PUSCH repetition consists of at least two second PUSCH repetitions and at least one of the at least two second PUSCH repetitions is obtained by dividing a third PUSCH repetition crossing a slot boundary; and
   receiving, by the network device, the at least one data TB on the first PDSCH repetition,
   wherein the method further comprises:
   based on determining that each of the at least two second PUSCH repetitions does not meet a first rule that a time domain length of a second PUSCH repetition is less than or equal to a first threshold value, receiving, by the network device, a data TB of the at least one data TB on each of the at least two second PUSCH repetitions independently.

7. The method according to claim 6, wherein the method further comprises:
   sending, by the network device, first configuration information, wherein the first configuration information is used to configure at least one third PUSCH repetition.

8. The method according to claim 6, wherein the method further comprises:
   based on determining that each of the at least two second PUSCH repetitions meets the first rule and meets a second rule, combining each of the at least two second PUSCH repetitions;
   wherein the second rule is whetherthe second PUSCH repetition has an adjacent second PUSCH repetition.

9. The method according to claim 6, wherein the method further comprises:
   based on determining that each of the at least two second PUSCH repetitions meets the first rule and does not meet a second rule, discarding each of the at least two second PUSCH repetitions,
   wherein the second rule is that a second PUSCH repetition has an adjacent second PUSCH repetition.

10. The method according to claim 6, wherein a reference signal is mapped according to the at least two second PUSCH repetitions.

11. A terminal device, comprising: a processor and a memory, the memory is configured to store a computer program, the processor is configured to call and run the computer program stored in the memory, and execute the steps of:
    determining a first physical uplink shared channel (PUSCH) repetition to which at least one data transport block (TB) is mapped, wherein the first PUSCH repetition consists of at least two second PUSCH repetitions and at least one of the at least two second PUSCH repetitions is obtained by dividing a third PUSCH repetition crossing a slot boundary; and
    controlling an output interface to transmit the at least one data TB on the first PUSCH repetition,
    wherein the processor is further configured to:
    based on determining that each of the at least two second PUSCH repetitions does not meet a first rule that a time domain length of a second PUSCH repetition is less than or equal to a first threshold value, transmit a data TB of the at least one data TB on each of the at least two second PUSCH repetitions independently.

12. The terminal device according to claim 11, wherein the processor is further configured to control an input interface to receive first configuration information, wherein the first configuration information is used to configure at least one third PUSCH repetition.

13. The terminal device according to claim 11, wherein the processor is further configured to, based on determining that each of the at least two second PUSCH repetitions meets the first rule and meets a second rule, determine to combine each of the at least two second PUSCH repetitions;
wherein the second rule is whether the second PUSCH repetition has an adjacent second PUSCH repetition.

14. The terminal device according to claim 11,
wherein the processor is configured to:
based on determining that each of the at least two second PUSCH repetitions meets the first rule and does not meet a second rule, discard each of the at least two second PUSCH repetitions,
wherein the second rule is that a second PUSCH repetition has an adjacent second PUSCH repetition.

15. The terminal device according to claim 11, wherein a reference signal is mapped according to the at least two second PUSCH repetition.

16. A network device, comprising: a processor and a memory, the memory is configured to store a computer program, the processor is configured to call and run the computer program stored in the memory, and execute the steps of:
determining a first physical uplink shared channel (PUSCH) repetition to which at least one data transport block (TB) is mapped, wherein the first PUSCH repetition consists of at least two second PUSCH repetitions and at least one of the at least two second PUSCH repetitions is obtained by dividing a third PUSCH repetition crossing a slot boundary; and
controlling an output interface to receive the at least one data TB on the first PUSCH repetition,
wherein the processor is further configured to:
based on determining that each of the at least two second PUSCH repetitions does not meet a first rule that a time domain length of a second PUSCH repetition is less than or equal to a first threshold value, receive a data TB of the at least one data TB on each of the at least two second PUSCH repetitions independently.

17. The network device according to claim 16, wherein the processor is further configured to control the output interface to send first configuration information, wherein the first configuration information is used to configure at least one third PUSCH repetition.

18. The network device according to claim 16, wherein the processor is further configured to:
based on determining that each of the at least two second PUSCH repetitions meets the first rule and meets a second rule, combine each of the at least two second PUSCH repetitions;
wherein the second rule is whether the second PUSCH repetition has an adjacent second PUSCH repetition.

19. The network device according to claim 16,
wherein the processor is configured to:
based on determining that each of the at least two second PUSCH repetitions meets the first rule and does not meet a second rule, discard each of the at least two second PUSCH repetitions,
wherein the second rule is that a second PUSCH repetition has an adjacent second PUSCH repetition.

20. The network device according to claim 16, wherein a reference signal is mapped according to the at least two second PUSCH repetition.

* * * * *